Jan. 22, 1963  SOICHIRO MATSUZAKI  3,074,329
EXPOSURE METER INTERLOCKING DEVICES FOR CAMERA
Filed Dec. 9, 1959
Fig. 1
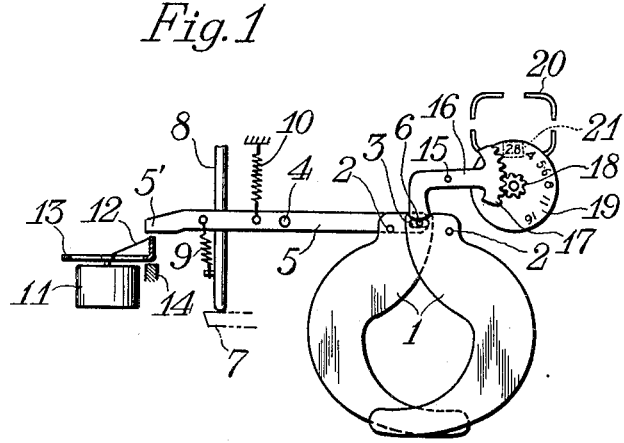
Fig. 2
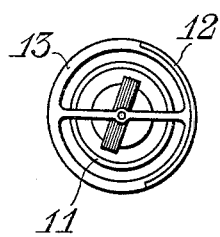
Fig. 3

United States Patent Office 3,074,329
Patented Jan. 22, 1963

3,074,329
EXPOSURE METER INTERLOCKING
DEVICES FOR CAMERA
Soichiro Matsuzaki, 9/424 Omachi, Chofu, Tokyo, Japan
Filed Dec. 9, 1959, Ser. No. 858,353
Claims priority, application Japan Dec. 10, 1958
2 Claims. (Cl. 95—10)

This invention relates to an exposure meter interlocking device for a camera and, more particularly, to such a device adapted to be used with a camera and including a diaphragm for a photographic objective comprising a pair of sectors of vario-shutter type.

An object of the invention is to provide a very simple device for interlocking an exposure meter with a lens diaphragm for a photographic objective in a camera.

Another object of the invention is to provide an improved device for interlocking an exposure meter with a diaphragm for a photographic objective and including simple means for controlling exposure times.

For a better understanding of the invention, reference should be had to the accompanying drawings wherein:

FIG. 1 shows schematically a front view illustrating essential parts of a preferred embodiment of the invention;

FIG. 2 shows a plan view of an exposure meter used in the device of FIG. 1; and

FIG. 3 shows a plan view of a brilliant frame disposed in a view finder for illustrating a position of a set stop number relative to the frame.

Although the present invention can be applied to both still cameras and cinecameras it will be in detail described as being applied to a camera such as the latter camera in which an exposure time provided by a shutter is constant as a rule.

Referring now to FIG. 1, there is shown schematically a device for interlocking an exposure meter with a diaphragm for a photographic objective in accordance with the teaching of the invention. A pair of falcate diaphragm sectors designated by the reference numeral 1 is pivotally mounted to a camera body (not shown) or an objective tube (not shown) at appropriate positions by means of pins 2 respectively and disposed symmetrically with respect to the optical axis of an objective. The sectors 1 are provided with slots 3 on their upper overlapped portions as viewed in FIG. 1 respectively and arranged such that the slots are aligned with each other. The aligned slots 3 includes a pin 6 loosely extending therethrough. The pin 6 is secured to an end of one arm of a lever 5 pivoted to the camera body at a fulcrum 4. An operating rod 8 for operating a shutter releasing element 7 is disposed within the camera so as to cross the lever 5 and includes a spring 9 having one end secured thereto and the other end anchored to the lever 5 on that side of the rod remote from the pin 6. The spring 9 has its resilience normally balanced with that of a spring 10 operatively connecting the lever 5 to the camera body between the operating rod 8 and the end of the lever arm on which the pin 6 is secured. Thereby the pin 6 maintains the sectors 1 in full open state.

As more clearly shown in FIG. 2, an electric exposure meter 11 for determining a brightness of an object to be photographed includes, in place of a usual pointer, a circular ring 13 having its center secured to a rotational shaft of a rotary unit in the exposure meter, and a cam 12 extending beyond one portion of the periphery thereof substantially perpendicular to the plane of the ring. The cam 12 has its height progressively increased from end to end. In order to cause the cam 12 to cooperate with the end 5' of the other arm of lever 5 or that end of the lever opposite to its end provided with the pin 6, the exposure meter 11 is disposed adjacent to and below the end 5' of the lever 5 at a position where the edge of ring 13 comes directly under said end 5', with the central axis of the rotary unit substantially perpendicular to the longitudinal axis of the lever 5. A supporting member 14 is suitably disposed directly under the edge of the ring 13 within the camera body for supporting the ring when the arm end 5' of the lever 5 will push down the cam 12.

The device described above is operated as follows:

If the camera will face an object to be photographed the exposure meter 11 will be operated to rotate the ring 13 until that operating portion of the cam 12 dependent upon the brightness of the object will come directly under the arm end 5' of the lever 5. At the same time, the ring 13 will be stopped. Now the operating rod 8 can be depressed by actuating the same externally of the camera. This effects counterclockwise rotation of the lever about its fulcrum 4 with the springs 9 and 10 elongated. The lever 5 is rested at a particular, tilted position dependent upon the height of the rotated cam 12 which has now been supported by the supporting member 14. As the lever 5 is thus tilted the pair of the diaphragm sectors 1 is moved to reduce the size of the aperture provided by the same, thereby to provide a proper exposure time. The further depression of the operating rod 8 will actuate the shutter-releasing element 7 to open and then close shutter sectors not illustrated.

If it is intended to apply the present invention to a camera such as a still camera comprising an exposure time-controller then it is only required to provide a suitable device for operatively connecting the lever 5 to the controller to cause a relative displacement of the lever with respect to the fulcrum 4 along the longitudinal axis of the lever and in the proper sense in accordance with a variation in exposure time. Such a procedure can also be utilized to compensate for a change in a sensitivity of a photosensitive material used. Further, the relative displacement of the lever 5 with respect to the fulcrum 4 can be employed to compensate for factors capable of being represented in the term of the exposure time, for example, a change in a number of film frames per a unit time and a change in aperture angle of a shutter in using a cinecamera, the type of filters used with a still camera and a cinecamera and the like.

It is advantageous to indicate a stop number set by the present invention, together with a brilliant frame in a vision field of a view finder as shown in FIG. 3. Returning back to FIG. 1, a bell crank 16 is pivotally mounted to the camera body through a pin 15 adjacent to the pin 6 for controlling the diaphragm sectors 1 and has one end abutting against the pin 6 and the other end provided with a toothed segment 17 which, in turn, engages a pinion 18 rotatably mounted to the camera body. The pinion 18 includes a rotatable disc 19 of an opaque material concentrically secured to the same for rotation therewith and including transparent figures representative of stop numbers on the periphery thereof. The indicating disc 19 is superposed with a lighting plate for forming a brilliant frame in the view finder (the plane of FIG. 1 corresponds to the lighting plate) and a window 21 is formed on the lighting plate adjacent to a light transparent frame 20 positioned on the same in such a manner that any one of the figures on the disc 19 appears through the window 21.

The interlocking device of the invention has advantages. It is very simple in mechanism and very durable in construction, because the invention comprises the use of an exposure meter including a ring provided on its periphery with a cam varied in height, instead of a pointer, and the conversion of a tilted angle of a lever adapted to push down the cam, into a proper aperture provided by diaphragm sectors. In addition, the displacement of a fulcrum for the lever can compensate for an exposure time or other factors for proper exposure capable of being represented in the term of the exposure time, so that a mechanism concerning such compensations can be advantageously realized in simple manner.

While the invention has been described in conjunction with one preferred embodiment thereof, it is to be understood that the invention is not limited thereto but is susceptible of various other changes and modifications without departing from the spirit thereof.

What is claimed is:

1. In a device for interlocking an exposure meter for measuring a range of light values with a diaphragm for a photographic objective in a camera, the combination of a pair of falcate diaphragm sectors disposed symmetrically with respect to the optical axis of the photographic objective, each of said diaphragm sectors being pivotally mounted by a pin at one end in said camera, said diaphragm sectors including portions overlapped with each other on which aligned slots are formed, a lever pivotally mounted to the camera body at a fulcrum, said lever including one arm provided with a pin loosely extending through the aligned slots, means for indicating stop numbers pivotally mounted adjacent the pin end of said lever, means for pivoting said indicating means in response to movement of said lever, an exposure meter including a rotational shaft having a ring-shaped cam secured thereto and positioned adjacent to the side of the other arm of said lever, said ring-shaped cam defining a cam surface extending smoothly outward for progressively increasing distances parallel to said rotational shaft, and extending peripherally for a portion of the circumference, said outwardly extending distances representing the range of light values measured by said exposure meter, and said cam surface for engaging the adjacent end of said lever, and a shutter operating rod interlocked with a shutter releasing element and operatively connected to said lever through a spring, whereby said lever is biased by said spring into contact with said ring-shaped cam by the operation of said shutter operating rod to pivot about its fulcrum a distance limited by said ring-shaped cam, thereby adjusting said falcate diaphragm sectors in accordance with the light value as measured by said exposure meter.

2. A device as claimed in claim 1, wherein said indicating means comprises an indicating disc including figures representative of stop numbers set by said exposure meter on the periphery thereof.

References Cited in the file of this patent

UNITED STATES PATENTS

| Re. 21,034 | Karg | Mar. 21, 1939 |
| 2,260,120 | Mayer | Oct. 21, 1941 |
| 2,923,216 | Greger | Feb. 2, 1960 |
| 2,930,282 | Herterich | Mar. 29, 1960 |

FOREIGN PATENTS

| 193,940 | Switzerland | Feb. 1, 1938 |